United States Patent
Hansen et al.

(10) Patent No.: US 10,623,261 B1
(45) Date of Patent: Apr. 14, 2020

(54) CONTACTLESS INFORMATION CAPTURE AND ENTRY FOR DEVICE MANAGEMENT

(71) Applicant: EMC IP Holding Company LLC, Hopkinton, MA (US)

(72) Inventors: Erik Shawn Hansen, Mission Viejo, CA (US); Scott Auchmoody, Irvine, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 114 days.

(21) Appl. No.: 15/282,838

(22) Filed: Sep. 30, 2016

(51) Int. Cl.
*H04W 4/80* (2018.01)
*H04L 12/24* (2006.01)

(52) U.S. Cl.
CPC ...... *H04L 41/0886* (2013.01); *H04L 41/0806* (2013.01); *H04W 4/80* (2018.02)

(58) Field of Classification Search
CPC ......... H04W 4/02; H04W 4/80; H04W 4/023; H04W 4/028; H04W 4/029; H04W 4/206; H04W 4/21; H04W 92/18; G06F 2221/2111; G06F 21/10; G06F 2221/0708
See application file for complete search history.

(56) References Cited

U.S. PATENT DOCUMENTS

| | | | | |
|---|---|---|---|---|
| 2004/0193449 A1* | 9/2004 | Wildman | ............... | G16H 40/20 705/2 |
| 2013/0019284 A1* | 1/2013 | Pacyga | ................. | H04W 12/08 726/4 |
| 2013/0247117 A1* | 9/2013 | Yamada | ................. | G08C 17/02 725/93 |
| 2016/0292428 A1* | 10/2016 | Brady | .................... | G06F 21/10 |

* cited by examiner

*Primary Examiner* — Ayaz R Sheikh
*Assistant Examiner* — Debebe A Asefa
(74) *Attorney, Agent, or Firm* — Womble Bond Dickinson (US) LLP

(57) ABSTRACT

One embodiment is related to a method for transferring device information, comprising: receiving, at a second device, device information of a first device with a close proximity communication technique without requiring manual entry of the device information; storing, at the second device, the device information in a digital text and/or numeric format; and transmitting the device information from the second device to the third device without requiring manual entry of the device information.

18 Claims, 4 Drawing Sheets

US 10,623,261 B1

CONTACTLESS INFORMATION CAPTURE AND ENTRY FOR DEVICE MANAGEMENT

FIELD OF THE INVENTION

Embodiments of the disclosure are related to electronic devices, and more particularly, to a method, apparatus, and system for automatically collecting and transferring device information in a datacenter.

BACKGROUND

Conventionally, management of devices within a datacenter is still a manual process in many areas. For example, manual entry (e.g., through a keyboard, touchpad, touchscreen, mouse, or other human interface input devices, etc.) of device information such as World Wide Names (WWNs), Hostnames, Internet Protocol (IP) address, serial numbers, etc. may be required. Requiring a human to read information and manually enter the information with a keyboard or the like introduces a possibility of error and is time-inefficient.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the disclosure are related to a method, apparatus, and system for automatically collecting and transferring device information in a datacenter. Device information of a first device may be received by a second device with a close proximity communication method without requiring manual entry of the information. The close proximity communication method may comprise one of barcode (linear or two-dimensional), Near Field Communication (NFC), Radio Frequency Identification (RFID), Optical Character Recognition (OCR), or the like. The information, once properly decoded and/or processed at the second device, may be stored at the second device in a digital text (e.g., text encoded with ASCII "American Standard Code for Information Interchange" or Unicode) and/or numeric format. The second device may further transmit the device information of the first device to a third device. The third device may be remote from both the first and second devices.

Figure 1:
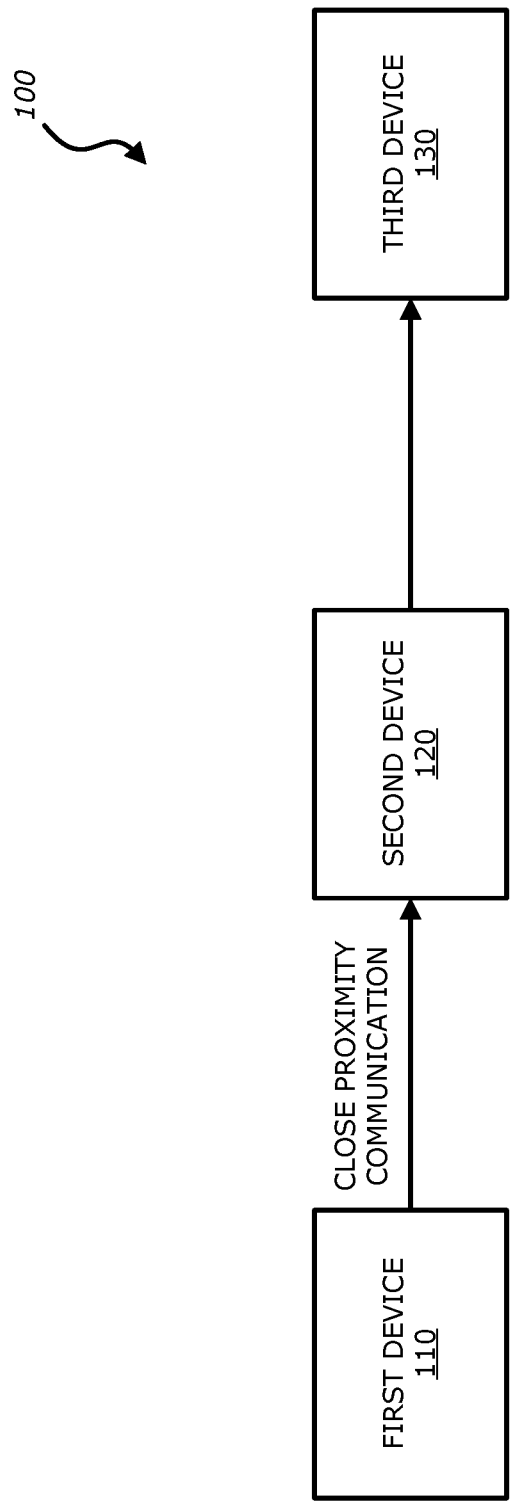
FIG. 1 is a block diagram illustrating an environment according to one embodiment of the disclosure.

Referring to FIG. 1, a block diagram illustrating an environment 100 according to one embodiment of the disclosure is shown. A first device 110 may be a device that is ordinarily placed in a datacenter. Examples of the first device 110 may include routers, switches, servers, firewalls, gateways, storage devices, etc. The device 110 may be associated with one or more pieces of information that may be useful in the management of a datacenter and need to be entered into another device. The information may be static or dynamic. A piece of static information is rarely, if ever, modified after the device is manufactured. In contrast, a piece of dynamic information may be modified from time to time. Static information may comprise a WWN, a Media Access Control (MAC) address, a hardware serial number, a model number, or the like. Dynamic information may comprise a Hostname, an IP address, or the like. Some information such as a software product key, a device physical location (e.g., building, row, rack, slot, etc.), or the like, may be either static or dynamic.

Device information of the first device 110, whether static or dynamic, may be received by a second device 120 through a close proximity communication method such as barcode (linear or two-dimensional), NFC, RFID, OCR, or the like. The first device 110 may comprise a label attached thereto that includes the static device information recorded thereon in a barcode or textual format. Alternatively, the static device information may be etched on an outside surface of the first device 110 in a barcode or textual format. Further, the first device 110 may comprise an NFC/RFID tag which, when interrogated, publishes the device information, both static and dynamic. In one embodiment, the first device 110 may be capable of updating the dynamic device information recorded in the NFC/RFID tag based on the current device configuration. In another embodiment, the first device 110 may comprise a display or may be connected to another device comprising a display, and may cause the display to show a barcode and/or text conveying one or both of static device information and/or up-to-date dynamic device information. The second device 120 may comprise one or more hardware components that enable it to receive information with one or more of the aforementioned methods. For example, the second device 120 may comprise a scanner or camera to read barcodes, an NFC/RFID reader to read NFC/RFID tags, a camera to capture images of text based on which OCR may be performed, or any combination thereof. The second device 120 may be a mobile device, a laptop computer, a desktop computer, etc. The second device 120 may prompt the user to select or specify the pieces of information to be gathered about the first device 110 and to specify the way the gathered information is to be used.

Once the second device 120 receives the device information of the first device 110, the second device 120 may store the information locally in a digital text and/or numeric format, after necessary processing (e.g., decoding the barcode, performing OCR, etc.). Afterwards, the second device 120 may transmit the device information of the first device 110 to a third device 130 in the digital text and/or numeric format. The third device 130 may be a switch, a storage device, a server, a management system, another mobile device, etc., and may be physically close to the second device 120 or may be remote from the second device 120 when the transmission takes place. The transmission of the device information from the second device 120 to the third device 130 may be automatic and require no manual entry of information. If the third device 130 is close to the second device 120, the transmission may be by a close proximity method such as NFC, RFID, Bluetooth, etc., or through a wired connection. In any case, the transmission may be through a local area network (LAN), a wide area network (WAN), or the Internet, etc. The third device 130 may be configured by the information received from the second device 120.

Figure 2:
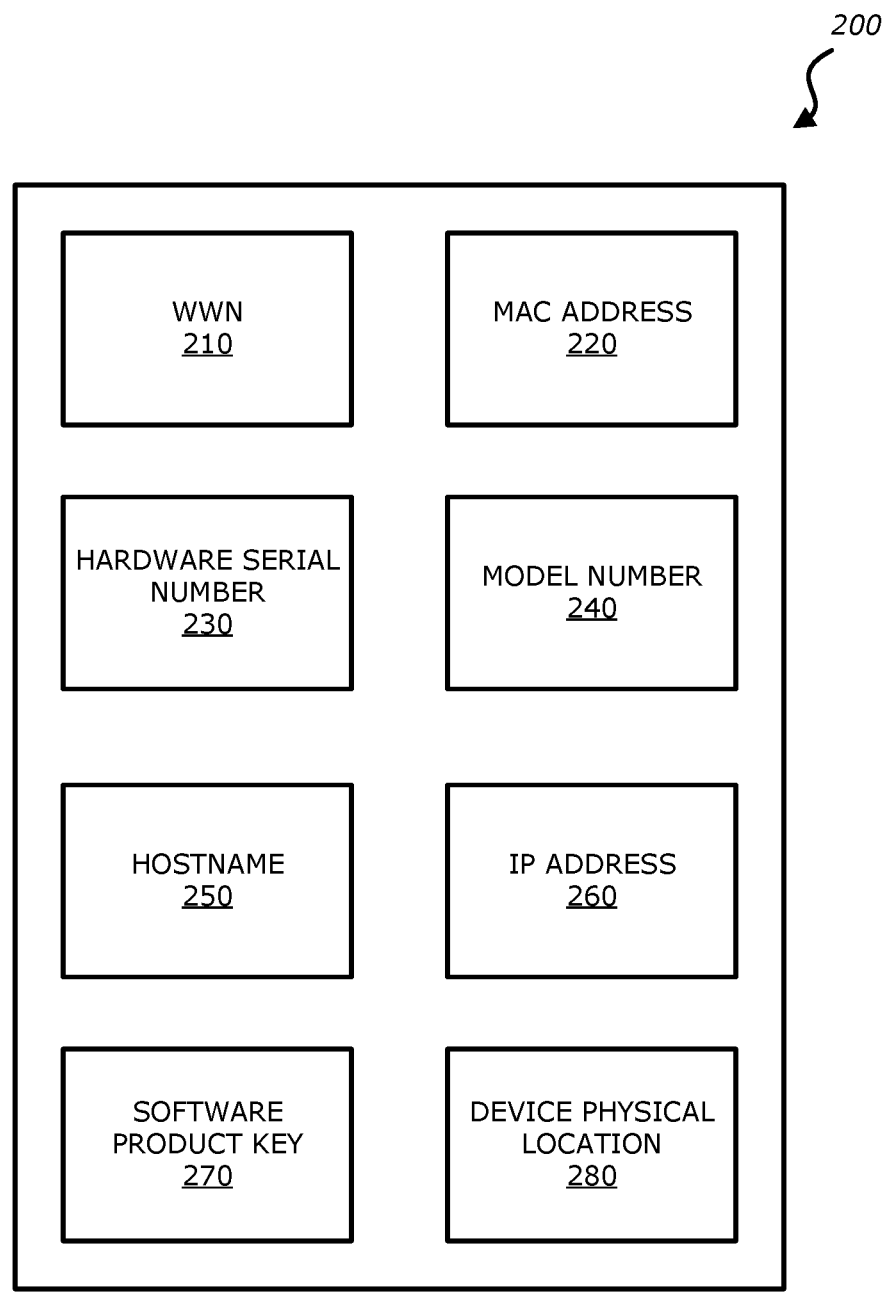
FIG. 2 is a block diagram illustrating various types of device information.

Referring to FIG. 2, a block diagram 200 illustrating various types of device information is shown. The device information may comprise a WWN 210, a MAC address 220, a hardware serial number 230, a model number 240, a Hostname 250, an IP address 260, a software product key 270, a device physical location 280, etc. The device physical location 280 may be determined based on one or more of: a manual entry, a global navigation satellite system (GNSS) position fix, wireless local area network (WLAN) or other signals-based triangulation/trilateration, etc., or any combination thereof. The list of the types of device information is exemplary and non-exhaustive, and does not limit the disclosure. The device information may further comprise other types of information. As described above, the WWN 210, the MAC address 220, the hardware serial number 230, and the model number 240 may be static; the Hostname 250 and the IP address 260 may be dynamic; and the software product key 270 and the device physical location 280 may be either static or dynamic, depending on the particular use case.

Figure 3:
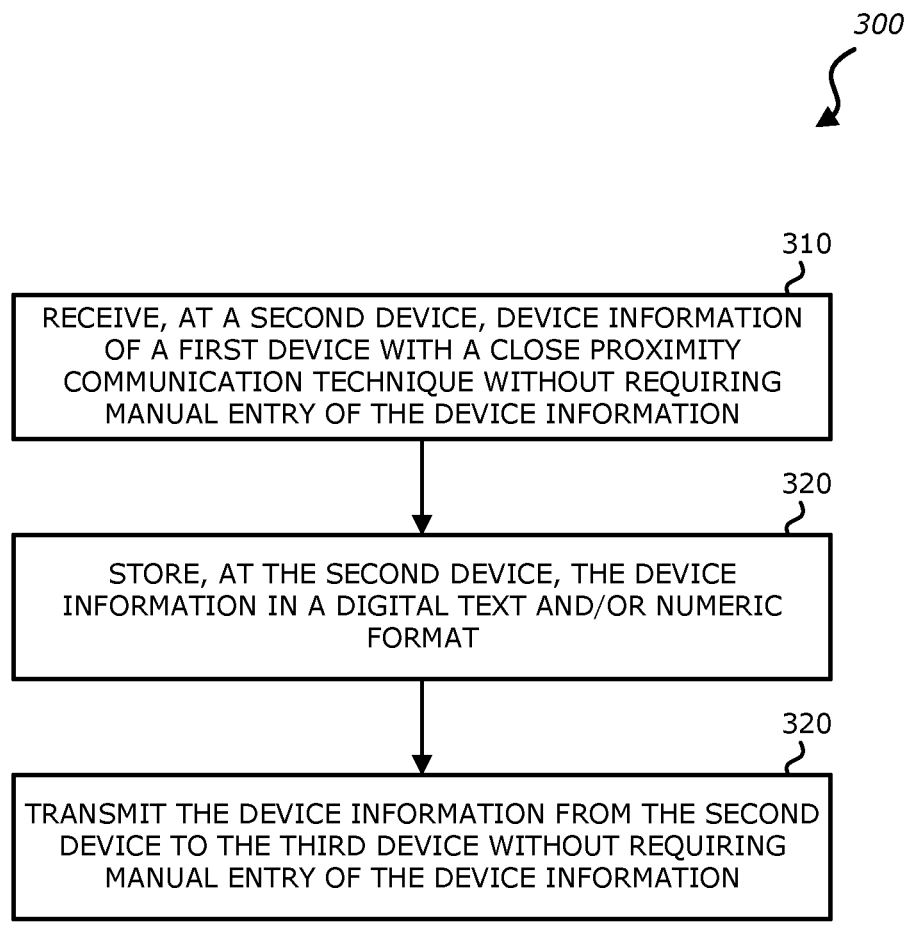
FIG. 3 is a flowchart illustrating an example method for transferring device information.

Referring to FIG. 3, a flowchart illustrating an example method 300 for transferring device information. At block 310, device information of a first device may be received at a second device with a close proximity communication technique without requiring manual entry of the device information. At block 320, the device information may be stored at the second device in a digital text and/or numeric format. At block 330, the device information may be transmitted from the second device to a third device without requiring manual entry of the device information.

Method 300 may be performed by processing logic that includes hardware (e.g. circuitry, dedicated logic, etc.), software (e.g., embodied on a non-transitory computer readable medium), or a combination thereof. For example, method 300 may be performed by processors 1501 of FIG. 4. Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

One embodiment of the disclosure is related to a data processing system, comprising: a processor; and a memory coupled to the processor storing instructions which, when executed by the processor, cause the processor to perform information transfer operations, the operations including receiving, at a second device, device information of a first device with a close proximity communication technique without requiring manual entry of the device information; storing, at the second device, the device information in a digital text and/or numeric format; and transmitting the device information from the second device to the third device without requiring manual entry of the device information.

In a world of increased automation and slimming margins within businesses, reducing the number of manual touch points in a datacenter environment both increases productivity and mitigates error. Complex pieces of information about connected devices continue to grow more complex (e.g., with the shift from IPv4 to IPv6). Swift yet accurate management of this information, especially in large enterprises, becomes more critical to the success of those businesses.

Therefore, with embodiments of the disclosure, device information of datacenter devices may be transferred and collected at a second device with a close proximity communication technique without involving manual entry of the device information. The device information may be further transmitted to a third device without involving manual entry of the device information. The third device may be physically a great distance away. Thus, the device information may be shared between people separated by a great physical distance efficiently and with high accuracy. Alternatively, the third device may also be close to the second device, and a close proximity communication technique may be used to transmit the device information from the second device to the third device.

Figure 4:
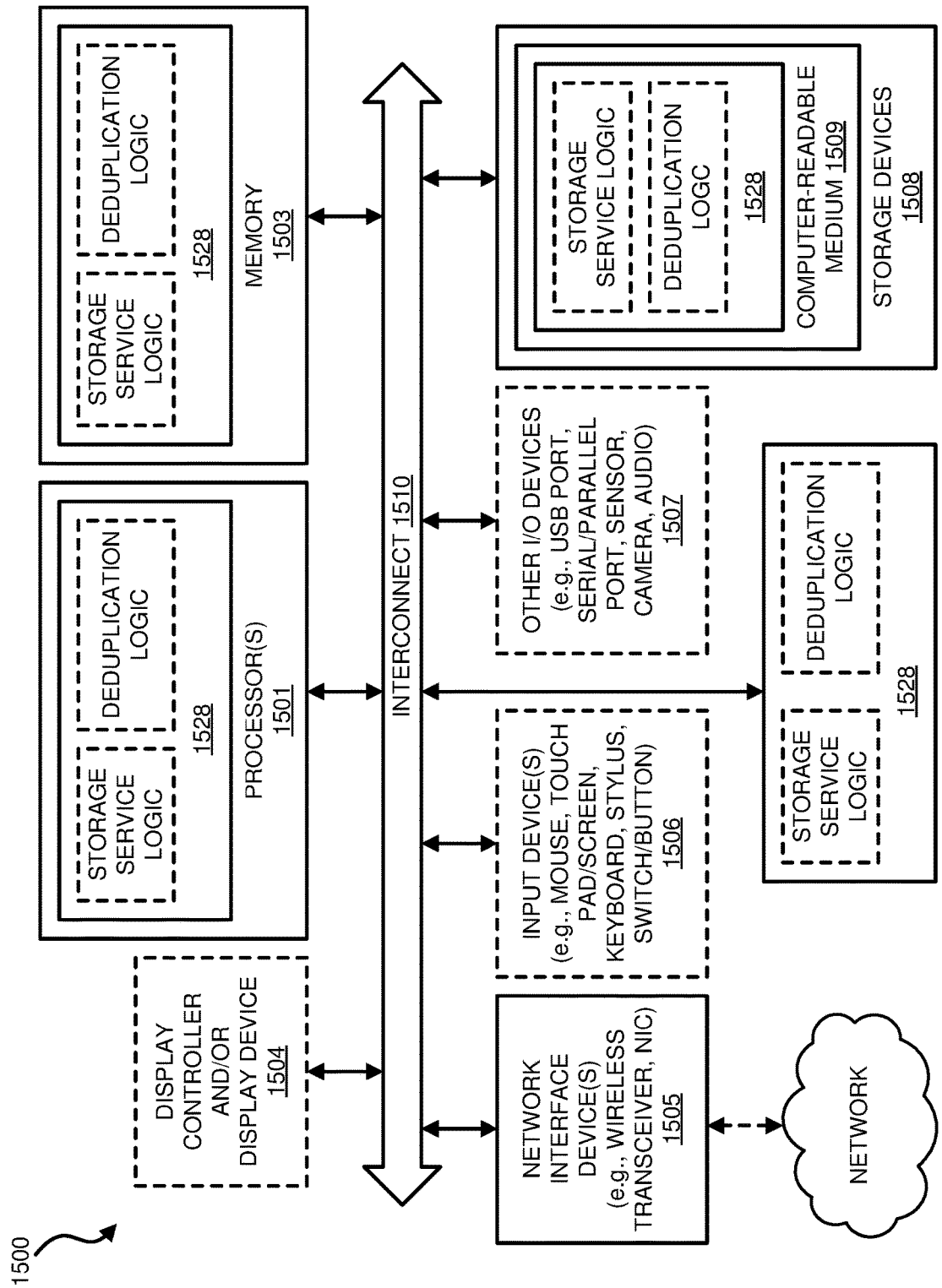
FIG. 4 is a block diagram illustrating an example of a data processing system which may be used with one embodiment of the disclosure.

FIG. 4 is a block diagram illustrating an example of a data processing system 1500 which may be used with one embodiment of the disclosure. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for transferring device information, comprising:
   receiving, at a second device, device information of a first device with a close proximity communication technique without requiring manual entry of the device information, wherein the device information of the first device comprises a World Wide Name (WWN) of the first device and one or more pieces of dynamic device information comprising one or more of: a Hostname of the first device, or an Internet Protocol (IP) address of the first device, wherein the first device is configured to update the one or more pieces of dynamic device information transmittable with the close proximity communication technique based on a current device configuration of the first device, and wherein the first device is a storage server in a datacenter storing data received from a plurality of client devices;
   storing, at the second device, the device information in a digital text and/or numeric format; and
   transmitting the device information from the second device to a third device without requiring manual entry of the device information, wherein the second device is a mobile device.

2. The method of claim 1, wherein the first device is one of a router, a switch, a server, a firewall, a gateway, or a storage device.

3. The method of claim 1, wherein the close proximity communication technique comprises one of barcode, Near Field Communication (NFC), Radio Frequency Identification (RFID), or Optical Character Recognition (OCR).

4. The method of claim 1, wherein the device information further comprises one of a Media Access Control (MAC) address, a hardware serial number, a model number, a software product key, a device physical location, or any combination thereof.

5. The method of claim 1, wherein the third device is remote from the second device.

6. The method of claim 1, wherein the device information is transmitted from the second device to the third device with a close proximity communication technique.

7. A non-transitory machine-readable medium having instructions stored therein which, when executed by a processor, cause the processor to perform information transfer operations, the operations comprising:
   receiving, at a second device, device information of a first device with a close proximity communication technique without requiring manual entry of the device information, wherein the device information of the first device comprises a World Wide Name (WWN) of the first device and one or more pieces of dynamic device information comprising one or more of: a Hostname of the first device, or an Internet Protocol (IP) address of the first device, wherein the first device is configured to update the one or more pieces of dynamic device information transmittable with the close proximity communication technique based on a current device configuration of the first device, and wherein the first device is a storage server in a datacenter storing data received from a plurality of client devices;
   storing, at the second device, the device information in a digital text and/or numeric format; and transmitting the device information from the second device to a third device without requiring manual entry of the device information, wherein the second device is a mobile device.

8. The non-transitory machine-readable medium of claim 7, wherein the first device is one of a router, a switch, a server, a firewall, a gateway, or a storage device.

9. The non-transitory machine-readable medium of claim 7, wherein the close proximity communication technique comprises one of barcode, Near Field Communication (NFC), Radio Frequency Identification (RFID), or Optical Character Recognition (OCR).

10. The non-transitory machine-readable medium of claim 7, wherein the device information further comprises one of a Media Access Control (MAC) address, a hardware serial number, a model number, a software product key, a device physical location, or any combination thereof.

11. The non-transitory machine-readable medium of claim 7, wherein the third device is remote from the second device.

12. The non-transitory machine-readable medium of claim 7, wherein the device information is transmitted from the second device to the third device with a close proximity communication technique.

13. A data processing system, comprising:
a processor; and
a memory coupled to the processor storing instructions which, when executed by the processor, cause the processor to perform information transfer operations, the operations including
receiving, at a second device, device information of a first device with a close proximity communication technique without requiring manual entry of the device information, wherein the device information of the first device comprises a World Wide Name (WWN) of the first device and one or more pieces of dynamic device information comprising one or more of: a Hostname of the first device, or an Internet Protocol (IP) address of the first device, wherein the first device is configured to update the one or more pieces of dynamic device information transmittable with the close proximity communication technique based on a current device configuration of the first device, and wherein the first device is a storage server in a datacenter storing data received from a plurality of client devices;
storing, at the second device, the device information in a digital text and/or numeric format; and
transmitting the device information from the second device to a third device without requiring manual entry of the device information, wherein the second device is a mobile device.

14. The data processing system of claim 13, wherein the first device is one of a router, a switch, a server, a firewall, a gateway, or a storage device.

15. The data processing system of claim 13, wherein the close proximity communication technique comprises one of barcode, Near Field Communication (NFC), Radio Frequency Identification (RFID), or Optical Character Recognition (OCR).

16. The data processing system of claim 13, wherein the device information further comprises one of a Media Access Control (MAC) address, a hardware serial number, a model number, a software product key, a device physical location, or any combination thereof.

17. The data processing system of claim 13, wherein the third device is remote from the second device.

18. The data processing system of claim 13, wherein the device information is transmitted from the second device to the third device with a close proximity communication technique.

* * * * *